(12) United States Patent
Wohlgenannt (10) Patent No.: US 11,820,564 B2
(45) Date of Patent: Nov. 21, 2023

(54) PROCESS FOR MANUFACTURING A SAFETY CLOSURE, AND SAFETY CLOSURE

(71) Applicant: CAPARTIS AG, Schaffhausen (CH)

(72) Inventor: Herbert Wohlgenannt, Schaffhausen (CH)

(73) Assignee: CAPARTIS AG, Schaffhausen (CH)

( * ) Notice: Subject to any disclaimer, the term of this patent is extended or adjusted under 35 U.S.C. 154(b) by 266 days.

(21) Appl. No.: 16/973,841

(22) PCT Filed: Jun. 18, 2019

(86) PCT No.: PCT/EP2019/066082
§ 371 (c)(1),
(2) Date: Dec. 10, 2020

(87) PCT Pub. No.: WO2019/243360
PCT Pub. Date: Dec. 26, 2019

(65) Prior Publication Data
US 2021/0122537 A1    Apr. 29, 2021

(51) Int. Cl.
*B65D 50/04* (2006.01)
*B29C 45/00* (2006.01)
*B29L 31/56* (2006.01)

(52) U.S. Cl.
CPC ........ *B65D 50/041* (2013.01); *B29C 45/0081* (2013.01); *B29L 2031/565* (2013.01)

(58) Field of Classification Search
CPC .................................................. B65D 50/041
(Continued)

(56) References Cited

U.S. PATENT DOCUMENTS 4,364,484 A * 12/1982 Kinsley ............... B65D 50/041
                                                215/220
4,402,416 A *  9/1983 Mumford ............ B65D 50/041
                                                215/220
(Continued)

FOREIGN PATENT DOCUMENTS

CH        598071 A5    4/1978
EP       1803656 A1    7/2007
(Continued)

OTHER PUBLICATIONS

International Search Report for PCT/EP2019/066082, Prepared by the European Patent Office, dated Oct. 9, 2019.

*Primary Examiner* — James N Smalley
(74) *Attorney, Agent, or Firm* — BROOKS KUSHMAN PC; John E. Nemazi (57) ABSTRACT

Disclosed is a process for manufacturing a safety closure, wherein in a first step, a monolithic injection-molded part is made having, one behind the other in the direction of a longitudinal axis (L), a rotary closure with a closure cap, a plurality of break-off points and an actuation piece, and in a second step, a force acting in the direction of the longitudinal axis (L) is applied to the injection-molded part such that the closure cap and the actuation piece move against each other in the direction of the longitudinal axis (L) and the closure cap slides at least partially into the actuation piece, the actuation piece being elastically deformed by the first engagement piece during the sliding-in movement so as to take an oval shape and then regaining its original shape once the sliding-in movement has been completed.

21 Claims, 8 Drawing Sheets

(58) Field of Classification Search
USPC .......................................................... 215/220
See application file for complete search history.

(56)  References Cited

U.S. PATENT DOCUMENTS 5,370,251 A * 12/1994 Buono ................. B65D 50/041
215/230
2009/0014404 A1    1/2009  Russell

FOREIGN PATENT DOCUMENTS

GB           1560583       10/1976
WO        2017143084 A1    8/2017

* cited by examiner

PROCESS FOR MANUFACTURING A SAFETY CLOSURE, AND SAFETY CLOSURE

CROSS-REFERENCE TO RELATED APPLICATION

This application is the U.S. national phase of PCT Application No. PCT/EP2019/066082 filed on Jun. 18, 2019, which is a Continuation in Part of PCT Patent Application No. PCT/EP2018/066066 filed on Jun. 18, 2018, the disclosures of which are incorporated in their entirety by reference herein.

The invention relates to a process for manufacturing a safety closure for a container. The invention also relates to an injection molded part for a safety closure. The invention also relates to a safety closure for a container.

PRIOR ART

It is known to provide rotary closures of bottles or containers with a safety device such that the rotary closure cannot be opened, or can only be opened with great difficulty, by children. Such safety closures are suitable, for example, for closing containers which contain pharmaceutical substances. Known safety closures have the disadvantage that the manufacturing thereof is relatively expensive. Document EP1803656A1 discloses a safety closure, the manufacturing of which takes place in two method steps, a first step, with which an injection molded part comprising a closure cap and an actuating part is produced, wherein the closure cap and the actuating part are connected to each other, and a second step, in which the closure cap and the actuating part are mutually displaced one inside the other and, in the process, are separated from each other such that ultimately a safety closure composed of the closure cap and the actuating part is produced. This safety closure has the disadvantages of the manufacturing being demanding, of the actuating part possibly being damaged as it is pushed inside the closure cap, and of the opening of the safety closure being difficult.

SUMMARY OF THE INVENTION

The invention is based on the object of creating a safety closure which is more cost-effective and is more reliable. This object is achieved by a process for manufacturing a safety closure. The object is furthermore achieved by an injection molded part for a safety closure. The object is furthermore achieved by a process for manufacturing a safety closure from an injection molded part.

The object is achieved in particular by a process for manufacturing a safety closure by, in a first process step, a one-piece injection molded part being produced which comprises, arranged following one another in the direction of a longitudinal axis, a rotary closure with a closure cap, a plurality of break-off points and an actuating part, wherein the rotary closure is connected to the actuating part via the break-off points, wherein the closure cap has an outer side comprising an outer surface, which runs in a circumferential direction with respect to the longitudinal axis and has an outer diameter, and wherein the closure cap also comprises a first engagement part on the outer side, wherein the actuating part has an inner side comprising an inner surface, which runs in the circumferential direction with respect to the longitudinal axis and has an inner diameter, wherein the actuating part also comprises a second engagement part on the inner side, wherein the outer diameter is smaller than or equal to the inner diameter, and wherein the first and the second engagement part partially overlap radially with respect to the longitudinal axis, and by, in a second process step, a force acting in the direction of the longitudinal axis being exerted on the injection molded part such that the closure cap and the actuating part are mutually displaced in the direction of the longitudinal axis and the closure cap is at least partially displaced into the actuating part, and, in the process, the first engagement part is pushed in the direction of the longitudinal axis completely over the second engagement part, wherein the actuating part is elastically and ovally deformed by the first engagement part during the pushing-in movement and resumes its original shape after the pushing-in movement has been completed.

The object is furthermore achieved in particular by an injection molded part for a safety closure, comprising, arranged following one another in the direction of a longitudinal axis, a rotary closure comprising a closure cap, a plurality of break-off points and an actuating part, wherein the rotary closure is connected to the actuating part via the break-off points, wherein the closure cap has an outer side comprising an outer surface, which runs in a circumferential direction with respect to the longitudinal axis and has an outer diameter, and wherein the closure cap also comprises a first engagement part on the outer side, which protrudes over the outer surface in a radial direction with respect to the longitudinal axis, wherein the actuating part has an inner side comprising an inner surface, which runs in the circumferential direction with respect to the longitudinal axis and has an inner diameter, wherein the actuating part also comprises a second engagement part on the inner side, wherein the outer diameter is smaller than or equal to the inner diameter, and wherein the first and the second engagement part partially overlap radially with respect to the longitudinal axis, wherein the first engagement part consists of a plurality of engagement part portions arranged mutually spaced apart in the circumferential direction and having intermediate spaces lying in between, wherein the intermediate spaces between the engagement part portions have an outer diameter which is reduced with respect to the engagement part portions.

The object is furthermore achieved in particular by a safety closure comprising a rotary closure with a closure cap having a longitudinal axis, and comprising an actuating part, wherein the closure cap has an outer side comprising an outer surface, which runs in a circumferential direction with respect to the longitudinal axis and has an outer diameter, and wherein the closure cap also comprises a first engagement part on the outer side, which engagement part protrudes over the outer surface in a direction radial with respect to the longitudinal axis, wherein the actuating part has an inner side comprising an inner surface, which runs in the circumferential direction with respect to the longitudinal axis and has an inner diameter, wherein the actuating part also comprises a second engagement part on the inner side, wherein the outer diameter is smaller than or equal to the inner diameter, wherein the closure cap and the actuating part are arranged concentrically with respect to the longitudinal axis, wherein the closure cap has an end side, and wherein the actuating part surrounds the closure cap along the outer surfaces, keeping the end side free, and wherein the first engagement part and the second engagement part partially overlap radially with respect to the longitudinal axis, wherein the first engagement part and the second engagement part are arranged opposite each other in the direction of the longitudinal axis and are mutually displaceable in the direction of the longitudinal axis such that the first engagement part and the second engagement part can be brought into mutual engagement, wherein the first engagement part comprises a plurality of engagement part portions which are arranged mutually spaced apart in the circumferential direction and have intermediate spaces lying in between, wherein the intermediate spaces between the engagement part portions have an outer diameter which is reduced with respect to the engagement part portions.

The safety closure according to the invention has the advantage of being able to be manufactured extremely cost-effectively and reliably by, in a first process step, a one-piece injection molded part being produced, and by, in a second process step, a force acting in the longitudinal direction being exerted on the injection molded part, and, by the subsequent pushing together of the injection molded part, a safety closure comprising a rotary closure and an actuating part being produced. In the case of previously known safety closures that have been manufactured in the previously mentioned manner, the problem arose, inter alia, that the rotary closure and the actuating part had engagement parts that were arranged in a mutually adapted manner but which did not reliably intermesh, and in particular not reliably over the long term, and therefore the safety closure, for example, could no longer be opened. In order to permit reliable engagement over the long term, the end sides of the mutually arranged engagement parts have to overlap to a certain width in the radial direction with respect to the longitudinal axis such that the end sides can lie directly opposite each other in said width and can therefore intermesh. In the case of previously known safety closures, the actuating part is expanded in a circularly symmetrical and also extremely powerful manner during the pushing-together movement, and therefore there is the risk of the actuating part being damaged or weakened during this operation. Despite this, the resulting engagement width of the opposite end sides of the engagement parts is limited. In the case of the process according to the invention, the actuating part is deformed elastically and also ovally during the pushing-together movement, wherein the actuating part resumes its original, preferably circular shape after the pushing-in movement has been completed. This process has the advantage that the tension brought about on the actuating part during the pushing-together movement is lower, and the end sides of the mutually arranged engagement parts can have a greater engagement width, and can therefore more reliably intermesh, and also reliably over the long term.

The actuating part has an inner circumferential length in the circumferential direction along the inner surface. The actuating part is particularly advantageously pushed over the rotary closure in such a manner that the inner circumferential length of the actuating part is maintained or is substantially maintained even during the oval deformation caused by the first engagement part, and therefore the actuating part undergoes negligibly little stretching, if any at all, in the circumferential direction and thus does not incur any damage. Ovally deformed is understood as meaning that, during the pushing-together movement, the actuating part temporarily assumes a shape deviating from the circular shape because of the first engagement part acting thereon, and thus temporarily assumes a non-circular shape, for example a shape in the form of an egg, an elongated and round shape or an ellipsoidal shape. Since the first engagement part advantageously substantially determines the shape which the actuating part takes up as it is being pushed over the first engagement part, the actuating part during the deformation preferably substantially follows the outer contour of the engagement part. The engagement part could, for example, also have an at least partially polygonal outer contour, and therefore the non-circular shape which the actuating part takes up temporarily could, for example, even be a polygon with rounded corners. The oval deformation of the actuating part also has the advantage that the actuating part can be configured with a relatively thick wall thickness without said actuating part being excessively loaded or damaged during the pushing-together movement.

The injection molded part is preferably configured as a single piece. However, it is also possible to produce the rotary closure and the actuating part separately and then to produce the safety closure by the actuating part being pushed over the rotary closure.

The safety closure according to the invention can be operated simply and safely. In addition, the safety closure according to the invention can be configured in a multiplicity of possibilities. For example, the end side of the closure cap can be configured in a multiplicity of possibilities, for example with imprints, stampings or three-dimensionally protruding bodies such that the safety closure according to the invention is also advantageously suitable for advertising purposes. The safety closure according to the invention can in particular also be provided with a design. In addition, the outer surface of the actuating part can also be configured in any way and, for example, in addition to a round shape, can also be configured in a triangular, square or polygonal shape or in a bulbous shape. The safety closure according to the invention can therefore be manufactured in a multiplicity of shapes.

In addition, in a further possible embodiment, the closure cap can have a passage in order, for example, to retrospectively also introduce a substance into a container, which may be advantageous in particular in the case of pharmaceutical products if an additional substance can still be supplied to the container shortly prior to use.

In a particularly advantageous refinement, the safety closure according to the invention comprises a tamper-evident seal in order to ensure that the closure has not yet been opened.

The invention will be described below with reference to exemplary embodiments.

BRIEF DESCRIPTION OF THE DRAWINGS

In the drawings used for explaining the exemplary embodiments.

Identical parts are basically provided with the same reference signs in the drawings.

Ways of Implementing the Invention

Figure 2:
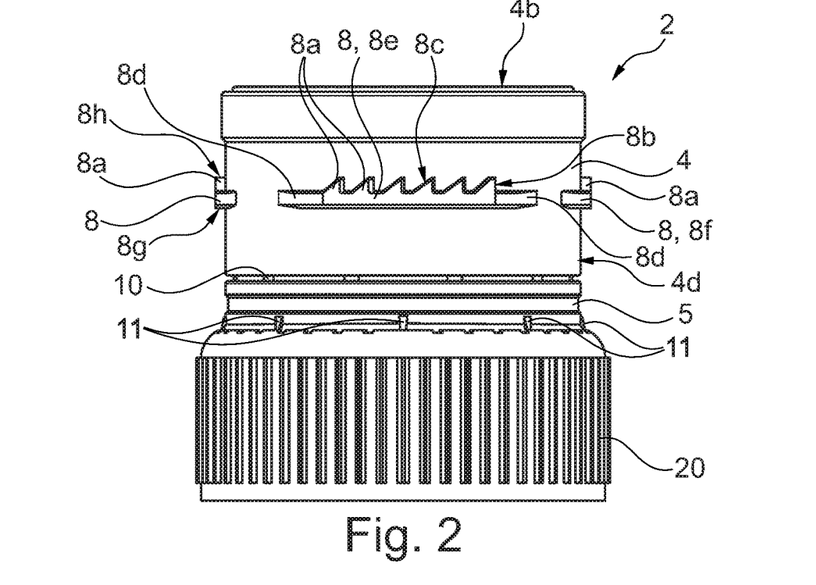
FIG. 2 shows a side view of the injection molded part according to FIG. 1.
Figure 3:
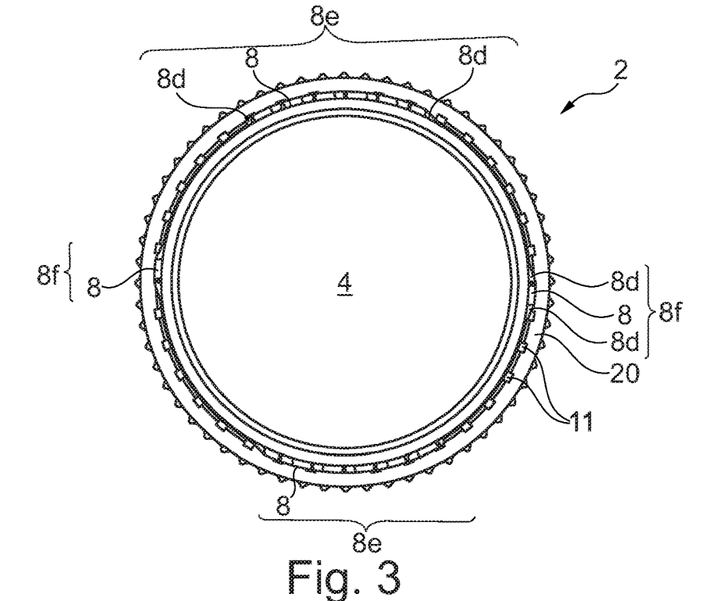
FIG. 3 shows an end view of the injection molded part according to FIG. 1.
Figure 4:
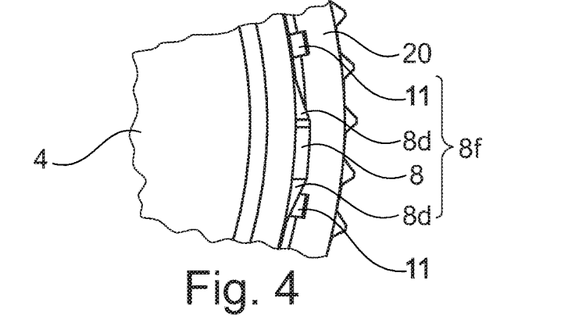
FIG. 4 shows a detail of the right edge of the injection molded part according to FIG. 3.
Figure 5:
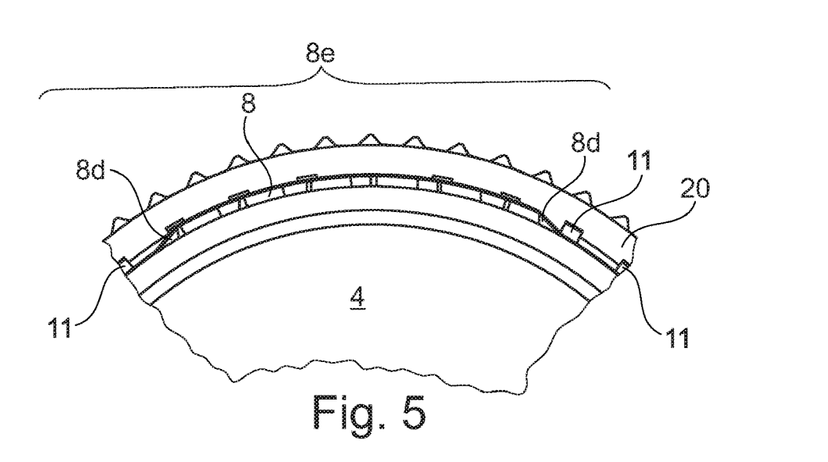
FIG. 5 shows a detail of the upper edge of the injection molded part according to FIG. 3.

FIGS. 1, 2, 3, 6 and 7 show one and the same injection molded part 2 in different views, and FIGS. 4 and 5 show detailed views of said injection molded part 2. Said injection molded part 2 which is configured in one piece is a semi-finished product with which a safety closure 1 can be manufactured. As is apparent in particular from FIG. 6, the injection molded part 2 comprises, arranged following one another in the direction of a longitudinal axis L, a rotary closure 3 comprising a closure cap 4, a plurality of break-off points 11 and an actuating part wherein the rotary closure 3 is connected to the actuating part 20 via the break-off points 11. The closure cap 4 is configured for closing an opening, such as, for example, an outlet having, for example, an outer thread, preferably for closing a container or a bottle. In the exemplary embodiment illustrated, the closure cap 4 has an inner thread 7. However, the closure cap 4 could also be configured for other types of rotary closures by the inner side of the closure cap 4 having, for example, means for a bayonet closure.

Figure 6:
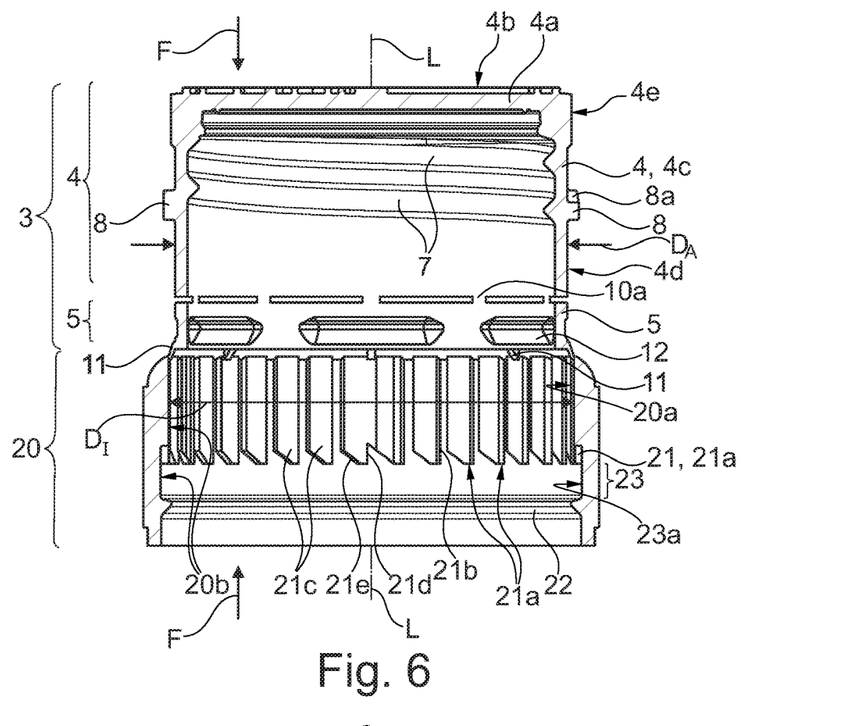
FIG. 6 shows a longitudinal section of the injection molded part according to FIG. 1.

The closure cap 4 comprises a circular end part 4a and a side part 4c which runs substantially in the shape of a hollow cylinder and on the inner side of which an inwardly protruding thread 7 is integrally formed.

The closure cap 4 has an outer side 4e, comprising an outer surface 4d, which runs in a circumferential direction U with respect to the longitudinal axis L and has an outer diameter $D_A$. The closure cap 4 also comprises a first engagement part 8 on the outer side 4e. The actuating part 20 has an inner side 20b, comprising an inner surface 20a, which runs in the circumferential direction U with respect to the longitudinal axis L and has an inner diameter $D_I$. The actuating part 20 also comprises a second engagement part 21 on the inner side 20b. The outer diameter $D_A$ is smaller than or equal to the inner diameter $D_I$. The first and the second engagement part 8, 21 partially overlap radially with respect to the longitudinal axis L, that is to say that the first engagement part 8 and the second engagement part 21 partially overlap, as viewed in the direction of the longitudinal axis L, and therefore, as is apparent, for example, from FIG. 6, the inner side 20b has to be expanded at least partially radially with respect to the longitudinal axis L in order to arrange the first engagement part 8 downstream of the second engagement part 21 in the direction of the longitudinal axis L, as illustrated, for example, in FIG. 10.

In the exemplary embodiment illustrated according to FIGS. 1 to 14, the actuating part 20 is configured to be annular and comprises a circular or substantially cylindrical inner surface which runs in the circumferential direction U with respect to the longitudinal axis L and has an inner diameter $D_I$. In the exemplary embodiment illustrated, the first engagement part 8 is configured in a manner protruding in the radial direction over the outer surface 4d and has upwardly protruding teeth 8a. The second engagement part 21 is set back in the radial direction with respect to the inner surface 20a and has a downwardly oriented end side 21a with teeth. The inner side 20b advantageously also comprises a stop part 22, which is spaced apart with respect to the second engagement part 21 in the direction of the longitudinal axis L and protrudes toward the longitudinal axis L, such that a retaining portion 23 with an inner surface 23a is formed between the second engagement part 21 and the stop part 22.

Figure 1:
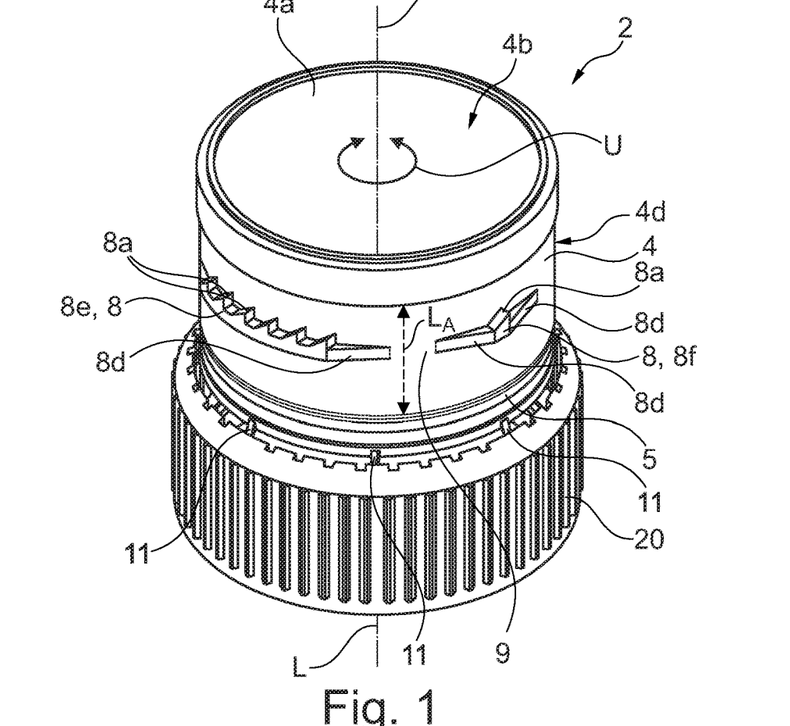
FIG. 1 shows a perspective view of an injection molded part of a safety closure.

As is apparent in particular from FIGS. 1 and 2, the first engagement part 8 consists of a plurality of engagement part portions 8e, 8f arranged mutually spaced apart in the circumferential direction U, wherein the intermediate spaces 9 between the engagement part portions 8e, 8f have the outer diameter $D_A$. The intermediate spaces 9 could be configured in the circumferential direction U between the engagement part portions 8e, 8f so as also to protrude slightly over the outer surface 4d in such a manner that they have a reduced outer diameter with respect to the engagement part portions 8e, 8f. Or in other words, in this configuration, the engagement part 8 could also be referred to as being configured so as to run continuously and completely in the circumferential direction U, with engagement part portions 8e, 8f protruding to a pronounced extent in the radial direction and with portions which are set back in the radial direction and form the intermediate spaces 9.

Advantageously, as illustrated in FIG. 1, solely the first engagement part 8 is arranged on the outer surface 4d in a manner protruding in the radial direction with respect to the longitudinal axis L. The engagement part portions 8e, 8f which are arranged mutually spaced apart in the circumferential direction U have the effect that the actuating part 20 is temporarily deformed ovally as it is being pushed over the closure cap 4. The length and the mutual distance of the engagement part portions 8e, 8f in the circumferential direction U substantially determine the shape of the oval deformation. The first and the second engagement part portion 8e, 8f advantageously differ in length in the circumferential direction U.

The first engagement part portion 8e and/or the second engagement part portion 8f advantageously have end portions 8d on both sides in the circumferential direction U that, as illustrated in FIG. 1, run out into the outer surface 4d.

The outer surface 4d advantageously has an overall length $L_A$ in the direction of the longitudinal axis L, wherein the outer surface 4d has the same outer diameter $D_A$ along the overall length $L_A$ in the region of the intermediate spaces 9 such that the actuating part 20 can be displaced at this location along the outer surface 4d without hindrance.

The first engagement part 8 has two different tasks. The first engagement part 8 firstly brings about the temporary oval deformation already described of the actuating part 20. For this purpose, in particular the flank 8g which acts on the actuating part 20 is of importance. In addition, the first engagement part 8, by means of its teeth 8a arranged on the upper side 8h, brings about an engagement in the second engagement part 21. The flank 8a is illustrated in FIG. 2 as running perpendicularly to the longitudinal direction L.

However, said flank 8a could also be configured running obliquely, circularly or semi-circularly, for example, in order, during the pushing-together movement of the actuating part 20 and the rotary closure 3, to allow the actuating part 20 to slide more gently over the first engagement part 8.

As is apparent in particular from FIG. 6, the second engagement part 21 consists of a plurality of partial bodies 21c which run in the longitudinal direction L and are mutually spaced apart in the circumferential direction U by means of intermediate spaces 21b, and which form an end side 21a with engagement surfaces 21d, 21e which can engage in the first engagement part 8 or in the teeth 8a thereof. The parts denoted by 21a, 21b, 21c, 21d and 21e form partial components of the engagement part 21.

In the exemplary embodiment illustrated, the rotary closure 3 comprises the closure cap 4 and a tamper-evident seal part 5 which is connected to the closure cap 4 via a plurality of points of weakness 10. The inner side of the tamper-evident seal part 5 also has at least one inwardly protruding retaining cam 12, which can consist for example of a single part, or of a plurality of parts that are mutually spaced apart in the circumferential direction U. In a further exemplary embodiment, the rotary closure 3 could have no tamper-evident seal part 5, and therefore the closure cap 4 is directly connected to the actuating part 20 via the break-off points 11.

The outer diameter $D_A$ of the outer surface 4d of the closure cap 4 is smaller than or equal to the inner diameter $D_I$ of the actuating part 20 such that the closure cap 4 is displaceable into the actuating part 20 by displacement in the direction of the longitudinal axis L. If the rotary closure comprises a tamper-evident seal part 5, this condition does of course also have to be met for the outer diameter D A of the tamper-evident seal part 5. The first engagement part 8 of the closure cap 4 and the second engagement part 21 of the actuating part 20 are configured in a mutually adapted manner in such a manner, or run in the radial direction with respect to the longitudinal axis L in such a manner, that, when the safety closure 1 is assembled, the two engagement parts 8, 21 intermesh and, in the process, delimit the maximally possible movement of the closure cap 4 and the actuating part 20 in one direction of the longitudinal axis L.

Figure 10:
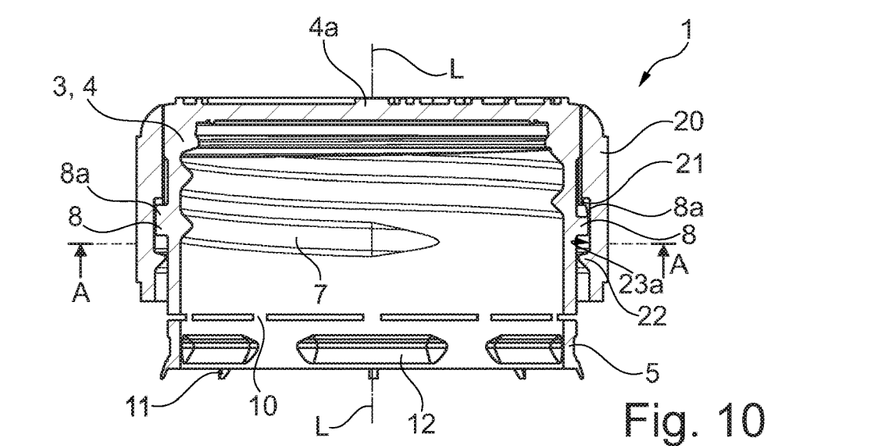
FIG. 10 shows a longitudinal section through a safety closure in a first position.
Figure 11:
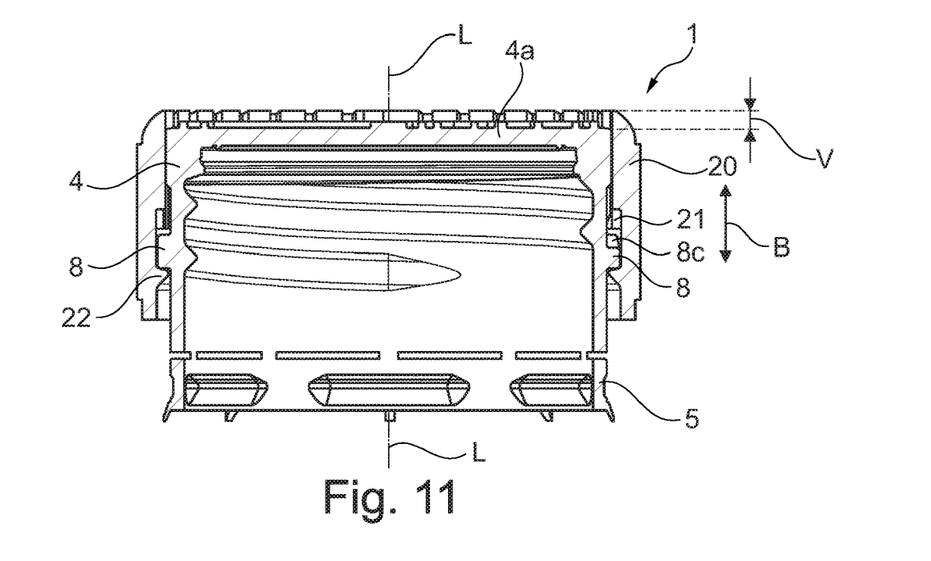
FIG. 11 shows a longitudinal section through the safety closure according to FIG. 10 in a second position.

The safety closure 1 according to the invention is produced by, in a first process step, the one-piece injection molded part 2 being produced, preferably by injection molding from plastic, and by, as illustrated in FIG. 6, in a second process step, a force F acting in the direction of the longitudinal axis L being exerted on the injection molded part 2 such that the rotary closure 3 with the closure cap 4 and possibly present tamper-evident seal 5 and the actuating part 20 are mutually displaced in the direction of the longitudinal axis L, and the rotary closure 3, as illustrated in FIGS. 10 and 11, is at least partially displaced into the interior of the actuating part 20, and the actuating part 20 is ovally deformed by the first engagement part 8 until the first engagement part 8 is pushed in the direction of the longitudinal axis L completely over the second engagement part 21 such that the first engagement part 8 and the second engagement part 21 or the engagement surfaces 8b, 8c, 21d, 21e thereof are then arranged lying opposite each other in the direction of the longitudinal axis L, and the actuating part 20 can resume its original, preferably circularly running shape.

As is apparent from FIGS. 6, 10 and 11, the second engagement part 21 and the stop part 22 form a retaining portion 23 with an inner surface 23a, wherein the first engagement part 8 engages in the holding portion 23 and is displaceable along the retaining portion 23 in the direction of the longitudinal axis L. The length of the retaining portion 23 determines the maximally mutually possible displacement path V of the rotary closure 3 and the actuating part 20 in the direction of the longitudinal axis L, wherein the first engagement part 8 and the second engagement part 21 partially or completely intermesh, or are mutually spaced apart and are not in contact with one another, depending on the mutual position of the closure cap 4 and the actuating part 20 in the direction of the longitudinal axis L.

When the safety closure 1 is finished, the first engagement part 8 and the second engagement part 21 have mutually aligned engagement surfaces 8b, 8c, 21d, 21e, wherein the engagement surfaces 8b, 8c, 21d, 21e are configured in such a manner, for example are undulating or tooth-shaped, that, in order to open the closure cap 4, a force acting in the longitudinal direction L has to be exerted on the actuating part 20 in order to transmit a torque of sufficient size for opening purposes and acting in the circumferential direction U to the closure cap 4 such that the latter is opened. The first engagement part 8 and the second engagement part 21, as illustrated in FIGS. 1, 2, 6 and 9, are particularly advantageously serrated, with a first engagement surface 8b, 21d running in the direction of the longitudinal axis L and with a second engagement surface 8c, 21e running transversely with respect to the longitudinal axis L. The serrated shape permits particularly simple closing of the closure cap 4 since no force acting in the longitudinal direction L has to be exerted on the actuating part 20.

Depending on the mutual configuration of the first engagement part 8 and of the second engagement part 21, rotation of the actuating part 20 in the one direction of rotation can now result in rotation of the closure cap 3. In the exemplary embodiment illustrated according to FIGS. 1 to 14, rotation of the actuating part 20 counterclockwise results in the actuating part being raised with respect to the closure cap 4 if no force is exerted on the actuating part 20 in the longitudinal direction L. If, during the rotation, a force is exerted on the actuating part in the longitudinal direction L, a torque is thereby transmitted to the closure cap 4, and the closure cap 4 can be opened. During rotation of the actuating part 20 in the clockwise direction, the closure cap 4 is rotated in the closing direction, or a closure cap 4 which has already been closed is tightened even more.

As is apparent from FIGS. 10 and 11, the first engagement part 8 of the closure cap 4 and the second engagement part 21 of the actuating part 20 are configured in a mutually adapted manner such that they are in mutual engagement in the safety closure 1, or can be brought into mutual engagement by mutual displacement in the direction of movement B. This mutual engagement has the effect that the rotary closure 3 and the actuating part 20 are connected to each other and are mutually displaceable maximally by the displacement path V in the direction of the longitudinal axis L or in the direction of movement B. FIG. 11 shows, in a longitudinal section, the safety closure 1 in a first extreme position with the actuating part 20 maximally raised in the direction of movement B with respect to the closure cap 4. In this position, the first engagement part 8 and the second engagement part 21 do not intermesh, and therefore the actuating part 20 is rotatable in the circumferential direction U in both directions without bringing about a torque on the closure cap 4. FIG. 10 shows, in a further longitudinal section, the safety closure 1 in a second extreme position with the actuating part maximally lowered in the direction of movement B with respect to the closure cap 4, in which position the first engagement part 8 and the second engagement part 21 are in complete engagement. The first and the second engagement part 8, 21 are mutually in contact, depending on the current rotational position, at their mutually aligned engagement surfaces 8b, 8c, 21d, 21e, wherein said engagement surfaces form an engagement width radially with respect to the longitudinal axis L, within which the mutually aligned engagement surfaces 8b, 8c, 21d, 21e can intermesh by displacement in the longitudinal direction L. In order to permit reliable engagement, and in order to ensure that, with this engagement, a sufficiently large torque can be transmitted from the actuating part to the rotary closure, a sufficiently large engagement width is advantageously required, said engagement width being advantageously able to be, for example, within a range of from 0.5 to 2 mm. The safety closure 1 with the rotary closure 3 arranged concentrically with respect to the longitudinal axis L and with the actuating part 20 advantageously has an identical engagement width over the entire circumferential direction U.

Figure 7:
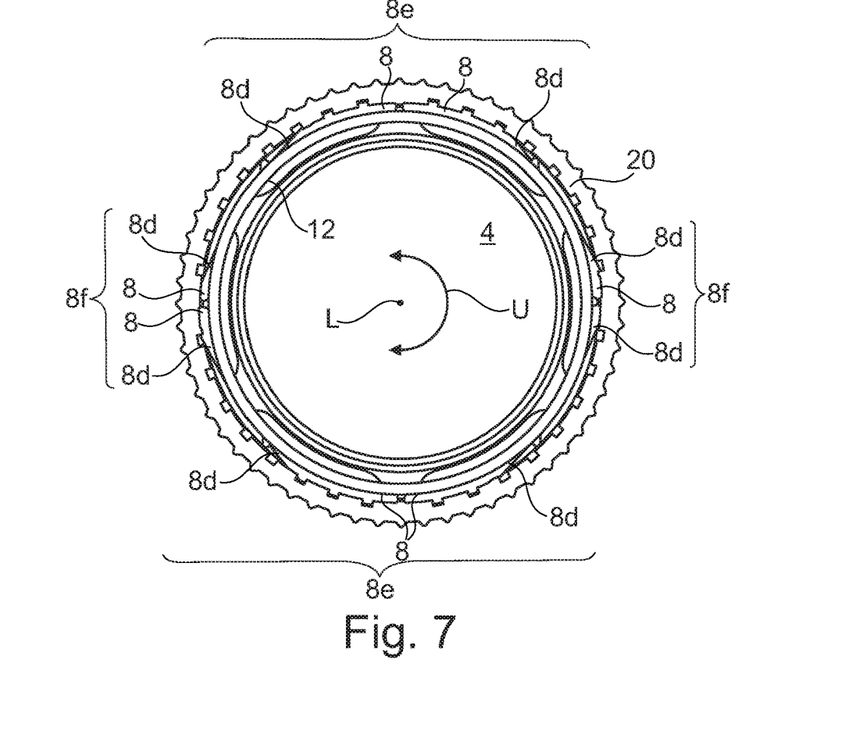
FIG. 7 shows a bottom view of the injection molded part according to FIG. 6.

FIG. 3 shows an end view of the injection molded part 2, and FIG. 7 a bottom view of the injection molded part 2, wherein in particular the closure cap 4 and also the first engagement part 8, comprising two first engagement part portions 8e and two second engagement part portions 8f, are illustrated. FIG. 4 shows the second engagement part portion 8f and FIG. 5 the first engagement part portion 8e of FIG. 3 in detail. Both the first engagement part portion 8e and the second engagement part portion 8f have a maximum height radially with respect to the longitudinal axis L in the center, and have end portions 8d on both sides in the circumferential direction U that, as is apparent from FIGS. 1 and 2, run out into the outer surface 4d such that an intermediate space 9 is formed in the circumferential direction U. As is apparent in particular from FIGS. 4 and 5, the first engagement part 8 partially overlaps in the radial direction with respect to the longitudinal axis L with the actuating part 20 such that, as is apparent from FIG. 7, the first engagement part 8 is arranged behind the actuating part 20, and therefore, when the first engagement part 8 is introduced into the actuating part 20, the inner diameter of the actuating part 20 has to be widened.

Figure 12:
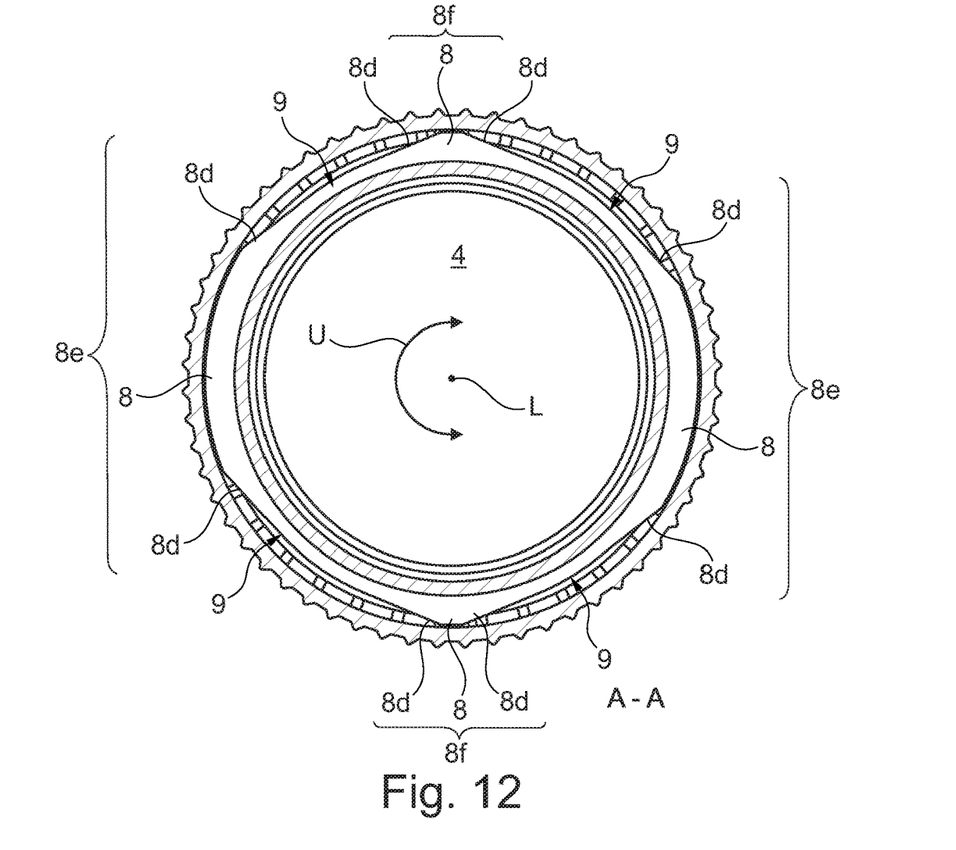
FIG. 12 shows a cross section through the safety closure according to FIG. 10 along the section line A-A.

In the second process step for manufacturing the safety closure 1, a force F acting in the direction of the longitudinal axis L has to be exerted on the injection molded part 2 so that the closure cap 4 and the actuating part 20 are mutually displaced in the direction of the longitudinal axis L, and, in the process, the first engagement part 8 is pushed in the direction of the longitudinal axis L completely over the second engagement part 21. The finished safety closure 1 is illustrated in FIG. 10, with FIG. 12 illustrating a section along the section line A-A. The first engagement part 8 is now in engagement with the retaining portion 23. The course of the first engagement part 8 in the circumferential direction U, with the radially protruding first engagement part portions 8e, the second engagement part portion 8f and the intermediate spaces 9 has the advantage that the first engagement part 8, upon being introduced into the inner side 20b of the actuating part 20, determines the occurring elastic oval deformation of the actuating part 20 by the inner side 20b lying against the first engagement part 8. During the elastic oval deformation, the intermediate spaces 9 are particularly important because they have the effect that the actuating part 20 can be ovally deformed, and, as a result, the stresses maximally occurring in the actuating part 20 can be predicted, wherein the dimensions of the actuating part 20 and the closure cap 4, and also the material thereof, are preferably selected in such a manner that, when the closure cap 4 is introduced into the actuating part 20, only an elastic deformation occurs such that, after the introduction has taken place, the actuating part 20 and possibly also the closure cap 4 resume their original shape, as is illustrated in FIGS. 10 to 12. The first engagement part 8 can be configured in a multiplicity of combinations in order to meet this condition. In particular, the number of intermediate spaces 9 can be varied, for example within a range of between 1 and 10, or the length in the circumferential direction U of the first engagement part portion 8e and/or second engagement part portion 8f can be varied, and/or the elasticity of the closure cap 4 and/or of the actuating part 20 can be varied by a corresponding choice of material, and/or the distance of the mutual overlap of the first and second engagement part 8, 21 radially with respect to the longitudinal axis L can be varied.

Figure 8:
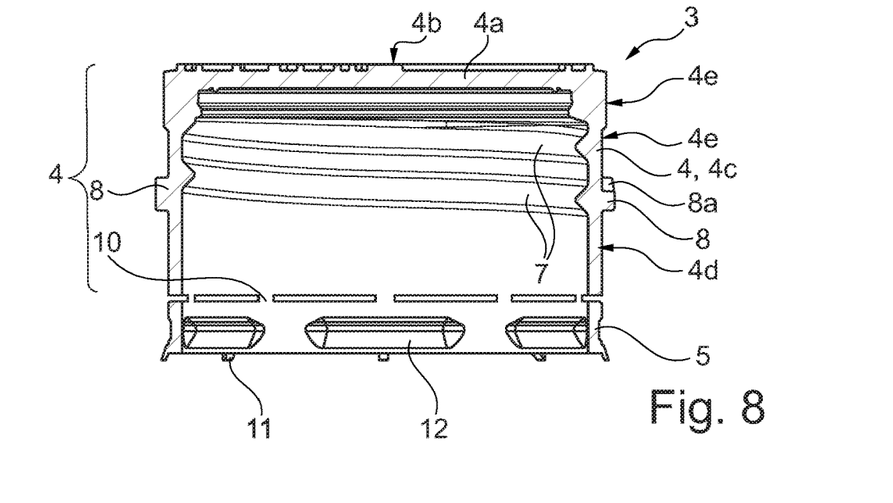
FIG. 8 shows a longitudinal section through a rotary closure.
Figure 13:
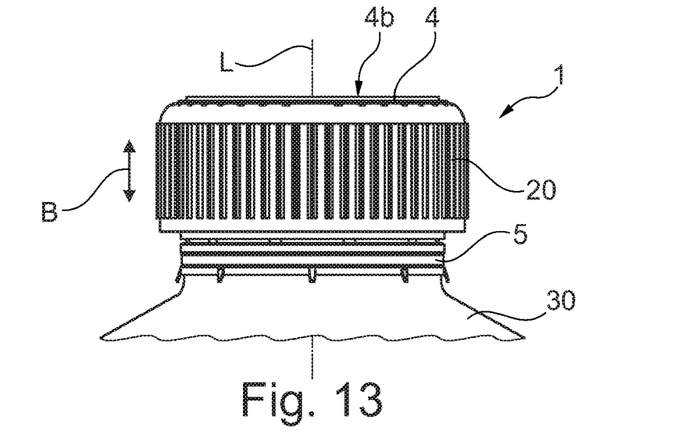
FIG. 13 shows a side view of a safety closure placed onto a bottle.
Figure 14:
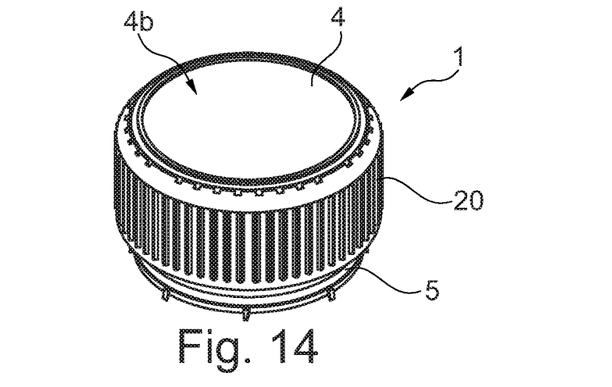
FIG. 14 shows a perspective view of the safety closure according to FIG. 13.

FIGS. 13 and 14 show the finished safety closure 1 which, in FIG. 13, closes the opening of a container 30. The closure cap 4 and the actuating part 20 are arranged concentrically with respect to the longitudinal axis L, wherein the closure cap 4 has an end side 4b, and wherein the actuating part 20 surrounds the closure cap 4 along the outer surfaces 4d, keeping the end side 4b free. Since the end side 4b is not covered by the actuating part 20, but rather is kept free, the end side 4b can be configured in a multiplicity of possibilities. For example, the end side 4b can have an imprint or, as illustrated in FIGS. 6 and 8, can have depressions which can be used for the graphical design. In addition, the end side 4b can have a three-dimensionally protruding body, preferably an advertising medium, such as for example a figure. However, the end side 4b can also be provided with an outlet for liquids, for example with a drinking aid, for example with a straw, such that the liquid can be removed from the container via said outlet. This is of advantage, for example, whenever the container opening is closed in the original state by a protective film. In order to open the container, first of all the safety closure 1 thus has to be opened, and then the protective film has to be peeled off from the container opening, and, after this, the safety closure 1 has to be screwed back onto the container opening such that the liquid in the container can then be removed via the outlet in the safety closure 1.

The exemplary embodiments illustrated show the actuating part 20 as being circular on the outside. However, the actuating part 20 can assume any desired shape on the outside since only the shape of the inner surface 20a is predetermined for the functioning of the safety closure 1. The actuating part 20 could also be configured, for example, in triangular, square or polygonal or oval form on the outside.

Figure 15:
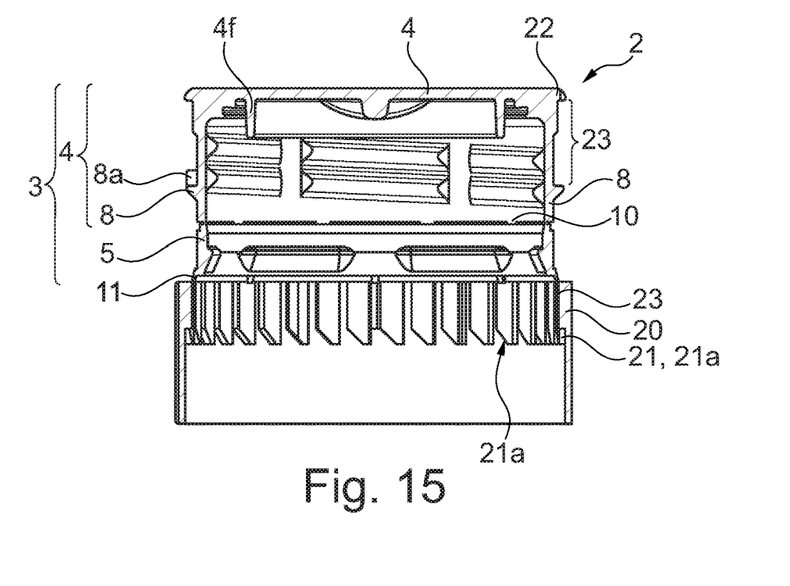
FIG. 15 shows a longitudinal section through a further exemplary embodiment of a safety closure.

FIG. 15 shows, in a longitudinal section, a further exemplary embodiment of an injection molded part 2 for manufacturing a safety closure 1. This injection molded part 2 is configured substantially identically to the injection molded part 2 illustrated in FIGS. 1 to 7, with the exception that the stop part 22 is arranged on the closure cap 4 and delimits the retaining portion 23 there, and that the closure cap has an inner lip 4f.

Figure 16:
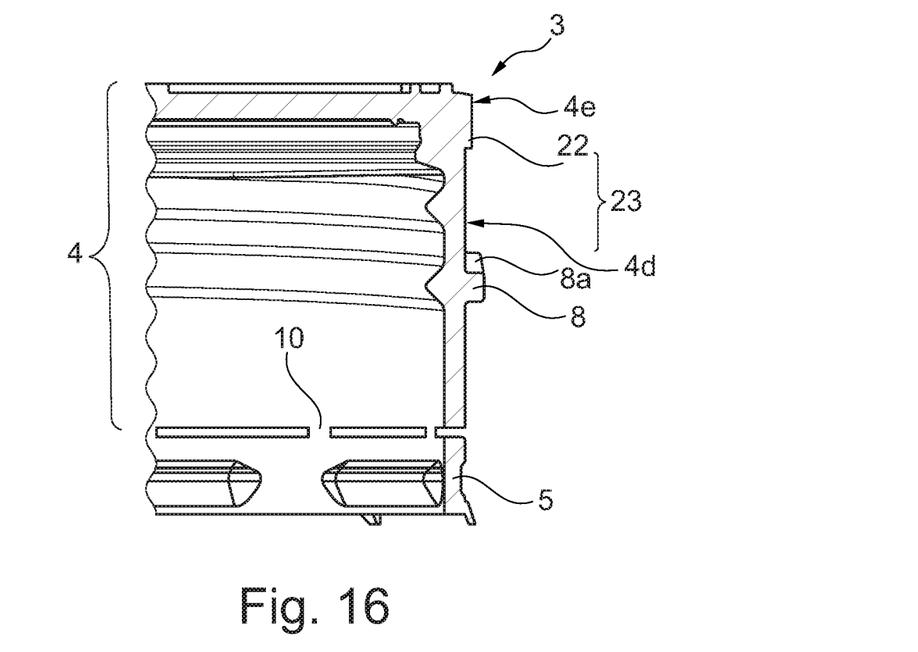
FIG. 16 shows a longitudinal section of a further exemplary embodiment of a rotary closure.
Figure 17:
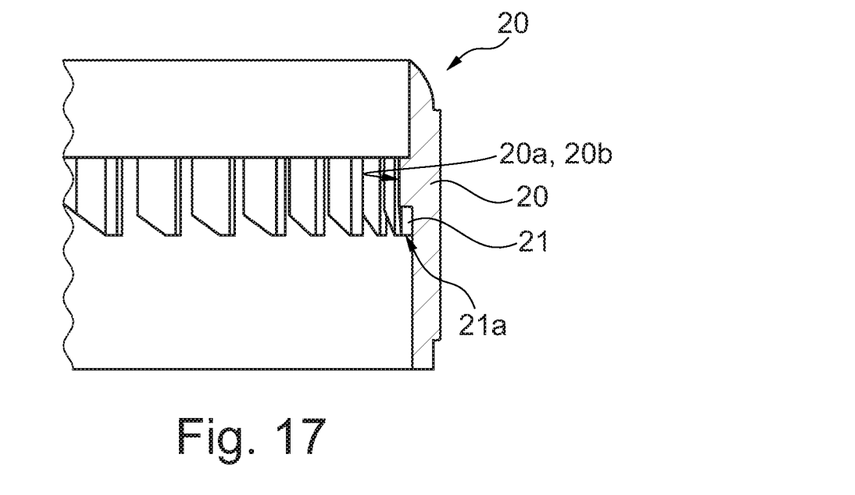
FIG. 17 shows a longitudinal section of an actuating part adapted to the rotary closure according to FIG. 16.

FIG. 16 shows, in an only partially illustrated longitudinal section, a further exemplary embodiment of a rotary closure 3 comprising a closure cap 4 and a tamper-evident seal 5 connected via points of weakness 10. The closure cap 4 comprises an outer side 4e, which comprises a stop part 22 and a first engagement part 8. The stop part 22 and the engagement part 8 are spaced apart in the direction of the longitudinal axis L by the length of a retaining portion 23. The engagement part 8 has a plurality of teeth 8a, which are oriented upward and are mutually spaced apart in the circumferential direction U. The closure cap 4 also comprises an outer surface 4d with an outer diameter $D_A$. FIG. 17 shows an actuating part 20 which is configured in a manner adapted to the rotary closure 3 according to FIG. 16. The actuating part 20 comprises an inner surface 20a, an inner side 20b and an inwardly protruding second engagement part 21 having a plurality of teeth 21a, which are oriented downward and are mutually spaced apart in the circumferential direction U. During the manufacturing of the safety closure, the rotary closure 3 is introduced into the actuating part 20 such that, in the view illustrated, the first engagement part 8 is pushed in the direction of the longitudinal axis L completely over the second engagement part 21, and therefore the second engagement part 21 is arranged in the retaining portion 23, and the movement of the second engagement part 21 in the direction of the longitudinal axis L is delimited by the stop part 22 and by the first engagement part 8 of the closure cap 4.

Figure 9:
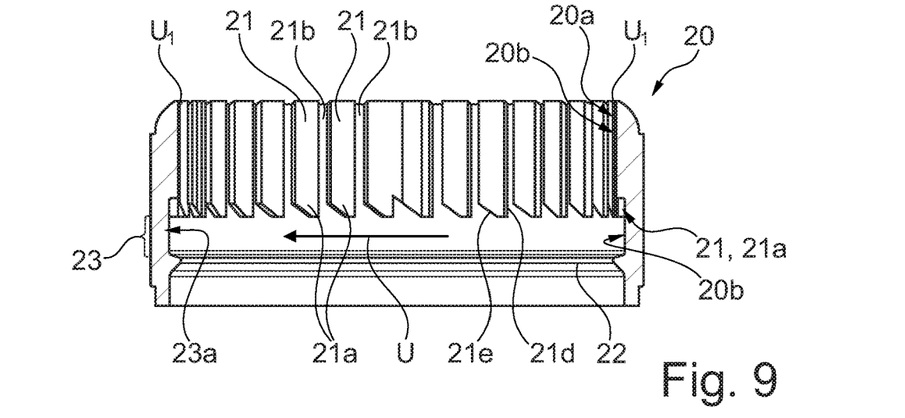
FIG. 9 shows a longitudinal section through an actuating part.
Figure 18:
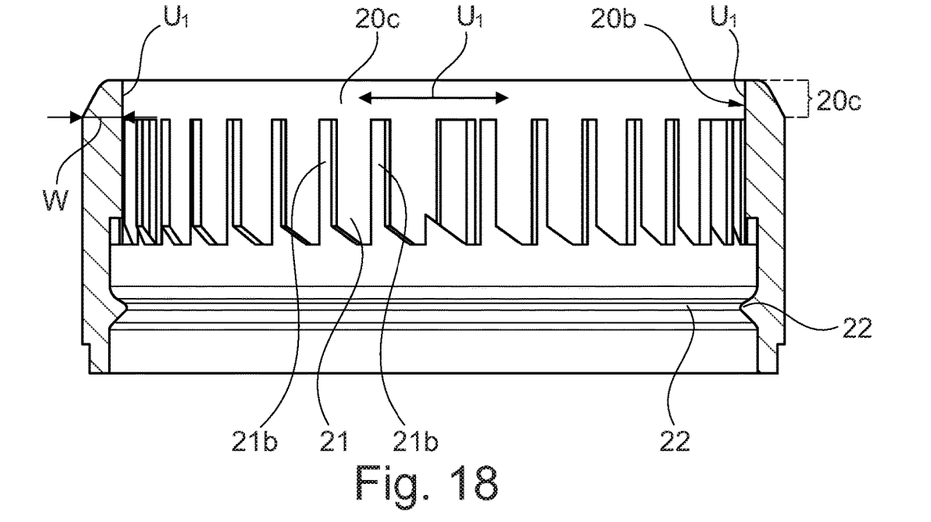
FIG. 18 shows a longitudinal section through a further exemplary embodiment of an actuating part.
Figure 19:
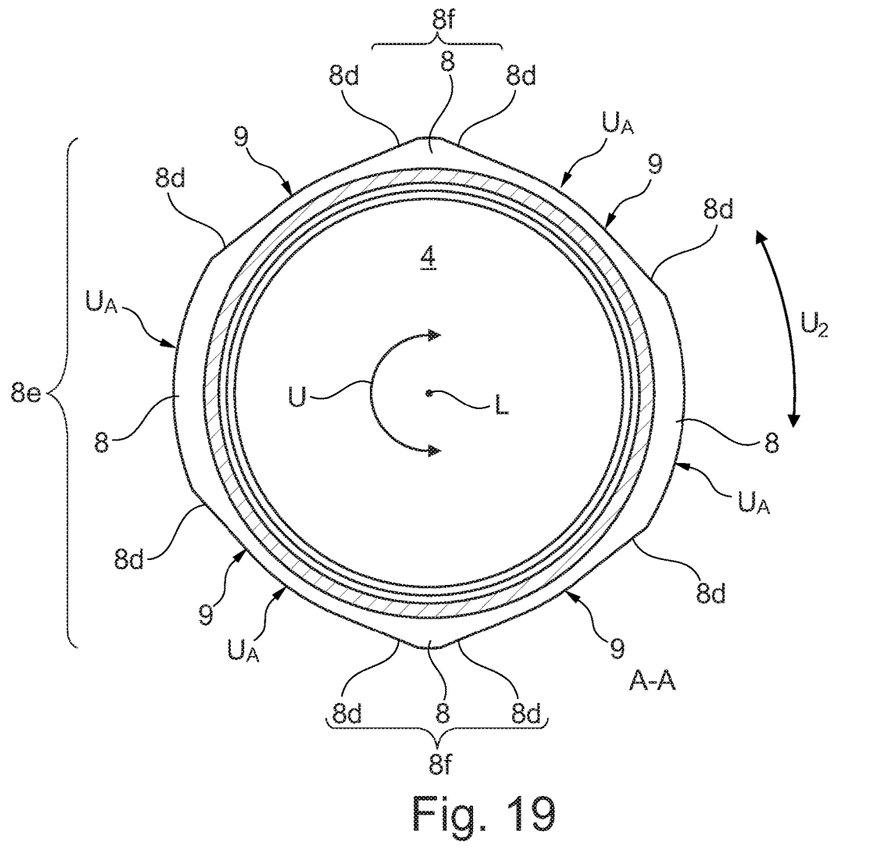
FIG. 19 shows the cross section according to FIG. 12, wherein essentially only the first engagement part is illustrated.

As illustrated in FIGS. 9 and 18, the actuating part 20 has an overall inner circumferential length $U_1$ along the inner surface 20a in the circumferential direction U, and the first engagement part 8 together with the intermediate spaces 9 has, as illustrated in FIG. 19, an overall outer circumferential length $U_2$ in the circumferential direction U, wherein the inner circumferential length $U_1$ is greater than or equal to the outer circumferential length $U_2$ such that, when the closure cap 4 and the actuating part 20 are brought together, the inner side 20b does not experience any stretching in the circumferential direction U. FIG. 19 shows the outer surface UA which, running along the first engagement part 8 and the intermediate spaces 9, defines the overall outer circumferential length $U_2$.

FIG. 18 shows a longitudinal section through a further exemplary embodiment of an actuating part 20 which, in the direction of the course of the longitudinal axis L, first of all has an input portion 20c, which is annular throughout in the circumferential direction and is free from intermediate spaces 21b, wherein the actuating part 20 has a wall thickness W radially with respect to the longitudinal axis L, wherein the actuating part 20 has a smaller wall thickness W, preferably a smaller maximum wall thickness W, than the input portion 20c in the region upstream or downstream of the stop part 22 in the direction of the longitudinal axis L. An actuating part 20 configured in such a manner is particularly dimensionally stable since the input portion 20c has such a thick wall thickness W that the actuating part 20 is more dimensionally stable.

The invention claimed is:

1. An injection molded safety closure, comprising, arranged following one another in the direction of a longitudinal axis (L), a rotary closure comprising a closure cap, a plurality of break-off points and an actuating part, wherein the rotary closure is connected to the actuating part via the break-off points, wherein the closure cap has an outer side comprising an outer surface, which runs in a circumferential direction (U) with respect to the longitudinal axis (L) and has an outer diameter (DA), and wherein the closure cap also comprises a first engagement part on the outer side, which protrudes over the outer surface in a radial direction (R) with respect to the longitudinal axis (L), wherein the actuating part has an inner side comprising an inner surface, which runs in the circumferential direction (U) with respect to the longitudinal axis (L) and has an inner diameter (DI), wherein the actuating part also comprises a second engagement part on the inner side, wherein the outer diameter (DA) is smaller than or equal to the inner diameter (DI), and wherein the first and the second engagement part partially overlap radially with respect to the longitudinal axis (L), wherein the first engagement part consists of a plurality of engagement part portions arranged mutually spaced apart in the circumferential direction (U) and having intermediate spaces lying in between, wherein the intermediate spaces between the engagement part portions have an outer diameter which is reduced with respect to the engagement part portions, wherein the first engagement part comprises at least two first and two second engagement part portions, and in that the first and second engagement part portions differ in length in the circumferential direction (U).

2. The injection molded safety closure as claimed in claim 1, wherein the intermediate spaces have the outer diameter (DA) of the outer surface.

3. The injection molded safety closure as claimed in claim 1, wherein solely the first engagement part is arranged on the outer surface.

4. The injection molded safety closure as claimed in claim 3, wherein the outer surface has an overall length (LA) in the direction of the longitudinal axis (L), and in that the outer surface has the same outer diameter (DA) along the overall length (LA) in the region of the intermediate spaces.

5. The injection molded safety closure as claimed in claim 1, wherein the first engagement part portion and the second engagement part portion have end portions on both sides in the circumferential direction (U), said end portions running out into the outer surface.

6. The injection molded safety closure as claimed in claim 1, wherein the second engagement part is set back in the radial direction with respect to the inner surface, and in that the inner side comprises a stop part, which is spaced apart in the direction of the longitudinal axis (L) with respect to the second engagement part and protrudes toward the longitudinal axis (L), such that a retaining portion is formed between the second engagement part and the stop part.

7. The injection molded safety closure as claimed in claim 1, wherein the actuating part has an inner circumferential length (U1) in the circumferential direction (U) along the inner surface, in that the first engagement part together with the intermediate spaces in the circumferential direction (U) has an outer circumferential length (U2), and in that the inner circumferential length (U1) is greater than or equal to the outer circumferential length (U2).

8. The injection molded safety closure as claimed in claim 1, wherein the rotary closure comprises a quality assurance part, in that the quality assurance part is arranged following the closure cap in the direction of the longitudinal axis (L) and is connected to the closure cap via points of weakness.

9. The injection molded safety closure as claimed in claim 1, wherein the actuating part in the direction of the course of the longitudinal axis (L) firstly has an input portion, which is configured to be annular throughout and to be free of intermediate spaces, and in that the actuating part has a wall thickness (W) radially with respect to the longitudinal axis (L), wherein the actuating part has a smaller wall thickness (W) than the input portion in the region upstream or downstream of the stop part in the direction of the longitudinal axis (L).

10. A safety closure comprising a rotary closure with a closure cap having a longitudinal axis (L), and comprising an actuating part, wherein the closure cap has an outer side comprising an outer surface, which runs in a circumferential direction (U) with respect to the longitudinal axis (L) and has an outer diameter (DA), and wherein the closure cap also comprises a first engagement part on the outer side (4e), which first engagement part protrudes over the outer surface in a direction (R) radial with respect to the longitudinal axis (L), wherein the actuating part has an inner side comprising an inner surface, which runs in the circumferential direction (U) with respect to the longitudinal axis (L) and has an inner diameter (DI), wherein the actuating part also comprises a second engagement part on the inner side, wherein the outer diameter (DA) is smaller than or equal to the inner diameter (DI), wherein the closure cap and the actuating part are arranged concentrically with respect to the longitudinal axis (L), wherein the closure cap has an end side, and wherein the actuating part surrounds the closure cap along the outer surfaces, and wherein the first engagement part and the second engagement part partially overlap radially with respect to the longitudinal axis (L), wherein the first engagement part and the second engagement part are arranged opposite each other in the direction of the longitudinal axis (L) and are mutually displaceable in the direction of the longitudinal axis (L) such that the first engagement part and the second engagement part can be brought into mutual engagement, wherein the first engagement part comprises a plurality of engagement part portions which are arranged mutually spaced apart in the circumferential direction (U) and have intermediate spaces lying in between, wherein the intermediate spaces between the engagement part portions have an outer diameter which is reduced with respect to the engagement part portions, wherein the first engagement part comprises at least two first and two second engagement part portions, and in that the first and second engagement part portions differ in length in the circumferential direction (U).

11. The safety closure as claimed in claim 10, wherein the intermediate spaces have the outer diameter (DA) of the outer surface.

12. The safety closure as claimed in claim 10, wherein solely the first engagement part is arranged on the outer surface.

13. The safety closure as claimed in claim 12, wherein the outer surface has an overall length (LA) in the direction of the longitudinal axis (L), and in that the outer surface has the same outer diameter (DA) along the overall length (LA) in the region of the intermediate spaces.

14. The safety closure as claimed in claim 10, wherein the first engagement part portion and the second engagement part portion have end portions on both sides in the circumferential direction (U), said end portions running out into the outer surface.

15. The safety closure as claimed in claim 10, wherein the actuating part has an inner circumferential length (U1) in the circumferential direction (U) along the inner surface, in that the first engagement part together with the intermediate spaces in the circumferential direction (U) has an outer circumferential length (U2), and in that the inner circumferential length (U1) is greater than or equal to the outer circumferential length (U2).

16. The safety closure as claimed in claim 10, wherein a stop part delimits a mutually maximally possible displacement path (V) of the first engagement part and second engagement part.

17. The safety closure as claimed in claim 10, wherein the first engagement part protrudes over the outer surface in the radial direction, in that the second engagement part is set back in the radial direction with respect to the inner surface, in that the inner side comprises a stop part, which is spaced part in the direction of the longitudinal axis (L) with respect to the second engagement part and protrudes toward the longitudinal axis (L), such that a retaining portion is formed between the second engagement part and the stop part, in that the first engagement part engages in the retaining portion and is displaceable along the retaining portion in the direction of the longitudinal axis (L).

18. The safety closure as claimed in claim 17, wherein the retaining portion determines the maximally mutually possible displacement path (V) of the rotary closure and the actuating part in the direction of the longitudinal axis (L), and in that the first engagement part and the second engagement part mutually intermesh or are not in contact with one another depending on the mutual position of the closure cap and the actuating part in the direction of the longitudinal axis (L).

19. The safety closure as claimed in claim 10, wherein the first engagement part and the second engagement part have mutually aligned engagement surfaces, wherein the engagement surfaces are configured in such a manner that, when the actuating part is rotated in the one circumferential direction (U), a torque can be transmitted to the closure cap, said torque being sufficient for opening the closure cap, and in that, when the actuating part is rotated in the opposite circumferential direction (U), a torque which is insufficient for opening the closure cap can be transmitted.

20. The safety closure as claimed in claim 19, wherein the first engagement part and the second engagement part are serrated, with a first engagement surface running in the direction of the longitudinal axis (L) and with a second engagement surface running transversely with respect to the longitudinal axis (L).

21. The safety closure as claimed in claim 10, wherein the actuating part in the direction of the course of the longitudinal axis (L) firstly has an input portion, which is configured to be annular throughout and to be free of intermediate spaces, and in that the actuating part has a wall thickness (W) radially with respect to the longitudinal axis (L), wherein the actuating part has a smaller wall thickness (W) than the input portion in the region upstream or downstream of the stop part in the direction of the longitudinal axis (L).

* * * * *